United States Patent [19]
Malamy et al.

[11] Patent Number: 6,100,898
[45] Date of Patent: Aug. 8, 2000

[54] SYSTEM AND METHOD OF SELECTING LEVEL OF DETAIL IN TEXTURE MAPPING

[75] Inventors: Adam Malamy, Foster City; Nicholas R. Baker, Cupertino; Adrian Sfarti, Sunnyvale; Victor Tirva, Mountain View, all of Calif.

[73] Assignee: WebTV Networks, Inc., Mountain View, Calif.

[21] Appl. No.: 09/057,171

[22] Filed: Apr. 8, 1998

[51] Int. Cl.$^7$ ...................................................... G06T 11/40
[52] U.S. Cl. ........................... 345/430; 345/441; 345/428
[58] Field of Search ................................... 345/430, 441, 345/443, 425, 428

[56] References Cited

U.S. PATENT DOCUMENTS

| | | | |
|---|---|---|---|
| 5,500,678 | 3/1996 | Puri | 348/408 |
| 5,684,941 | 11/1997 | Dye | 395/141 |
| 5,706,418 | 1/1998 | Uchiyama | 395/130 |
| 5,812,141 | 9/1998 | Kamen et al. | 345/430 |

*Primary Examiner*—Mark K. Zimmerman
*Assistant Examiner*—Mano Padmanabhan
*Attorney, Agent, or Firm*—Workman, Nydegger, Seeley

[57] ABSTRACT

A system and method of selecting a level of detail in a texture-mapping system. Pixels are processed in a zig-zag traversal pattern to allow determination of vertical and horizontal change values in texture map coordinates. In this manner, accurate level of detail selection is achieved without unduly reducing efficiency or throughput of the graphics system.

16 Claims, 12 Drawing Sheets

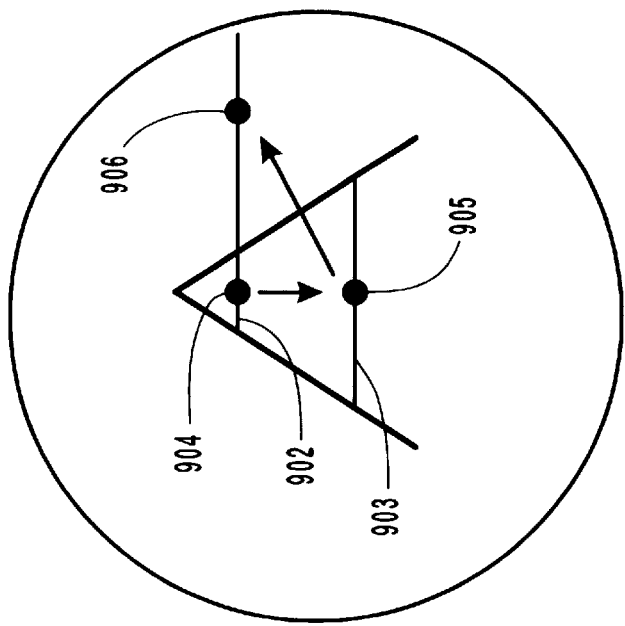
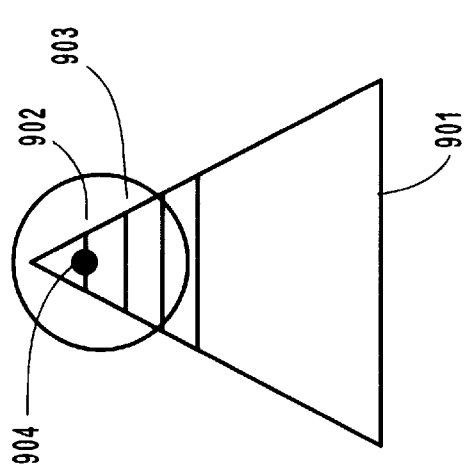
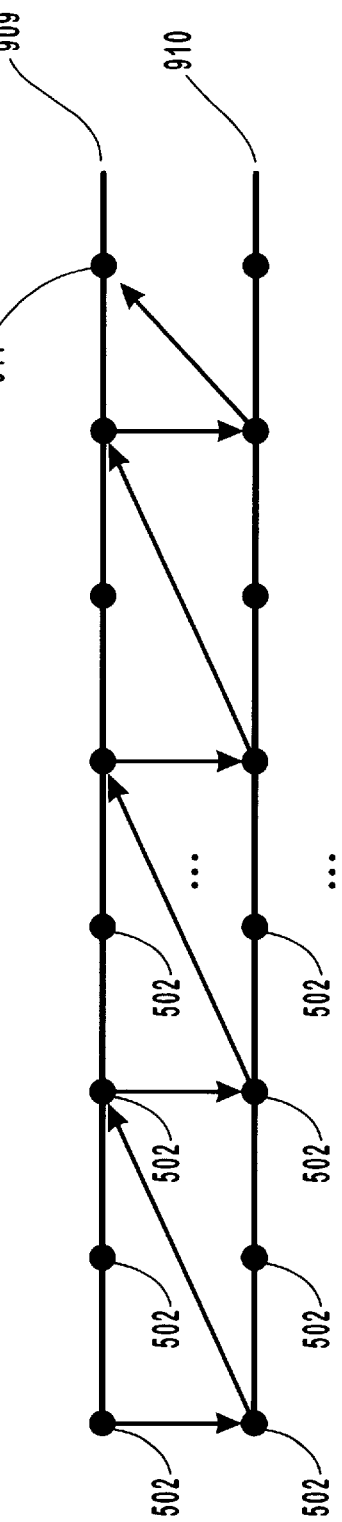
FIG. 9A
FIG. 9B

SYSTEM AND METHOD OF SELECTING LEVEL OF DETAIL IN TEXTURE MAPPING

CROSS-REFERENCE TO RELATED APPLICATION

The present application is related to U.S. application Ser. No. 09/057,393, Malamy et al., "Polygon Rendering Method And System With Dedicated Setup Engine", filed Apr. 8, 1998 the disclosure of which is incorporated herein by reference.

BACKGROUND OF THE INVENTION

1. Field of the Invention

The present invention relates generally to texture mapping in graphics systems, and more particularly to a system and method of selecting a level of detail for texture mapping operations.

2. Description of Background Art

Texture mapping is a well known technique in computer-implemented graphics systems. In general, texture mapping involves mapping a two-dimensional image ("texture") onto a selected region in a frame buffer or other two-dimensional space. The selected region may represent, for example, a projection of a surface in three-dimensional space. In such a situation, texture mapping is often used to convey the impression that the surface is a component of a solid object in three-dimensional space, having surface characteristics corresponding to the defined texture.

In principle, the concept of texture mapping operates as follows. The surface to be rendered contains a number of individual picture elements ("pixels"), that may be identified by reference to their coordinates (x,y) in two-dimensional screen space. The texture to be mapped onto the surface contains a number of individual texture elements ("texels"), that may be identified by reference to their coordinates (u,v) in two-dimensional texture space. Each texel has certain material values such as color, luminance, and the like, defined by the texture stored in the texture map.

Each pixel in the surface to be rendered is mapped to a particular texel, and the material values associated with that texel are applied to the pixel. In some situations, values may be interpolated and/or filtered among two or more texels for application to a pixel. Since the surface and the texture may be of differing shapes and sizes, the process of applying the texture to the surface often involves scaling and interpolation. In particular, when the surface being rendered is representative of a three-dimensional surface, perspective correction and other distortion techniques are applied in order to provide a realistic appearance.

In many situations, the process of scaling a texture in order to apply it to a surface may be computationally expensive. Typically, such scaling is accomplished by filtering, or averaging, material values for a number of texels in order to derive a material value to be applied to a pixel. Where the scaling factor is significant, such filtering techniques are often too slow for realtime rendering operations.

Accordingly, it is known in the art to provide several versions of a texture map, each associated with a different level of detail (LOD). These versions are usually developed a priori, so that they may be available as needed during rendering operations. During rendering, the system selects the LOD most suitable for rendering a particular pixel, so as to reduce the complexity of scaling operations that need to be performed. Generally, such selection is performed based on the relative area of the surface being rendered, as compared with the size of the texel to be mapped. The smaller the area, corresponding to a smaller total number of pixels in the surface, the lower the level of detail selected.

Once an LOD has been selected, any of a number of techniques may be used for filtering of the texture. These techniques determine a material value to be applied to a pixel at a particular x,y coordinate that corresponds to a u,v position in the texture. For example, any of the following four techniques, among others, are in general use, depending on the application and the limitations of the particular system:

Point sampling (the nearest LOD is selected, and the material value for the nearest texel to position u,v is used)

Linear filtering (the nearest two LODs are selected; material values for the nearest texel to position u,v in each LOD are determined; a weighted average between the two material values, weighted by the relative proximity to each LOD, is used)

Bilinear filtering (the nearest LOD is selected, and the material values for the four nearest texels to position u,v are subject to weighted averaging based on the exact value of u,v; the weighted average is used)

Trilinear filtering (the above-described bilinear filtering technique is applied to the nearest two LODs; a weighted average between the two results, weighted by the relative proximity to each LOD, is used)

Whichever of the above techniques is used, the system must first select an appropriate LOD to be used for each pixel to be rendered. One known technique for LOD selection is to measure the distance in texture space coordinates (u,v) that corresponds to a unit distance in screen space coordinates (x,y). A large change in texture space coordinates indicates that the texture can be traversed in fewer unit steps, and therefore a smaller LOD should be used. Conversely, a small change in texture space coordinates indicates that a larger LOD should be used.

The distance in texture space coordinates corresponding to a unit distance in screen space is expressed as $(\Delta u, \Delta v)$. Graphics systems generally select LOD for a given pixel (x,y) by taking the base-two logarithm of the largest measured value of $\Delta u$ or $\Delta v$ surrounding point (x,y). Ideally, all $\Delta u$ and $\Delta v$ values for a unit circle (in screen space) around point (x,y) would be measured and the largest value taken. However, due to the impracticality of computing $\Delta u$ and $\Delta v$ for all points around a unit circle, most graphics systems sample discrete points. Typically, a pixel directly above and/or below the point (i.e. (x,y−1) and/or (x,y+1)), and a pixel directly horizontally adjacent to the point (i.e. (x−1,y) and/or (x+1,y)) are used. Some systems also use the pixels diagonally adjacent to the point (i.e. (x−1,y−1), (x−1,y+1), (x+1,y−1), and/or (x+1,y+1)) and scale down to take into account that such pixels do not lie on the unit circle.

All of the above techniques introduce computational complexity due to the fact that each measurement of $\Delta u$ and $\Delta v$ requires a significant amount of calculation. Typically, in order to determine u and v values for a given pixel, two additions, two multiplications, and one division are required. On the other hand, a sufficient number of such comparisons are required in order to facilitate satisfactory LOD selection. Thus, in many systems, LOD selection is compromised by the fact that an insufficient number of $\Delta u$ and $\Delta v$ values are available. Conversely, some systems are able to perform the additional computations for more accurate LOD selection, but such systems generally require relatively powerful processors.

What is needed is a system and method of determining a sufficient number of Δu and Δv values surrounding a given pixel to provide effective selection of LOD, without introducing undue computational expense.

SUMMARY OF THE INVENTION

In accordance with the present invention, there is provided a system and method of LOD selection that significantly reduces the computational expense associated with determining Δu and Δv values, and thereby improves performance. Pixels are processed in a zigzag pattern to take advantage of pipelining techniques. LOD selection for a particular pixel is deferred until u and v values for two succeeding pixels have been determined. Since these u and v values may then be reused in rendering other pixels, the present invention minimizes the additional burden involved in LOD selection.

LOD selection is based on two pairs of Δu and Δv values: a horizontal pair representing texture map distance associated with a unit movement in the horizontal direction in screen space; and a vertical pair representing texture map distance associated with a unit movement in the vertical direction in screen space. The system employs a zigzag traversal pattern in screen space, so that a given pixel is followed by two succeeding pixels, each representing movement along one of the two axes. By delaying LOD determination until two succeeding pixels have been processed, the system has at its disposal the data required to measure the values for the desired two pairs of Δu and Δv values. The two pairs of values may then be processed to obtain the largest delta value, and the base-two logarithm of this value may be used for LOD selection.

By using the above-described technique, the system and method of the present invention are able to provide accurate selection of an appropriate LOD without introducing significant additional complexity to the rendering process.

BRIEF DESCRIPTION OF THE DRAWINGS

FIG. 9A shows an example of a span having one pixel.

FIG. 9B shows an example of a span having an even number of pixels.

DETAILED DESCRIPTION OF THE INVENTION

Figure 1:
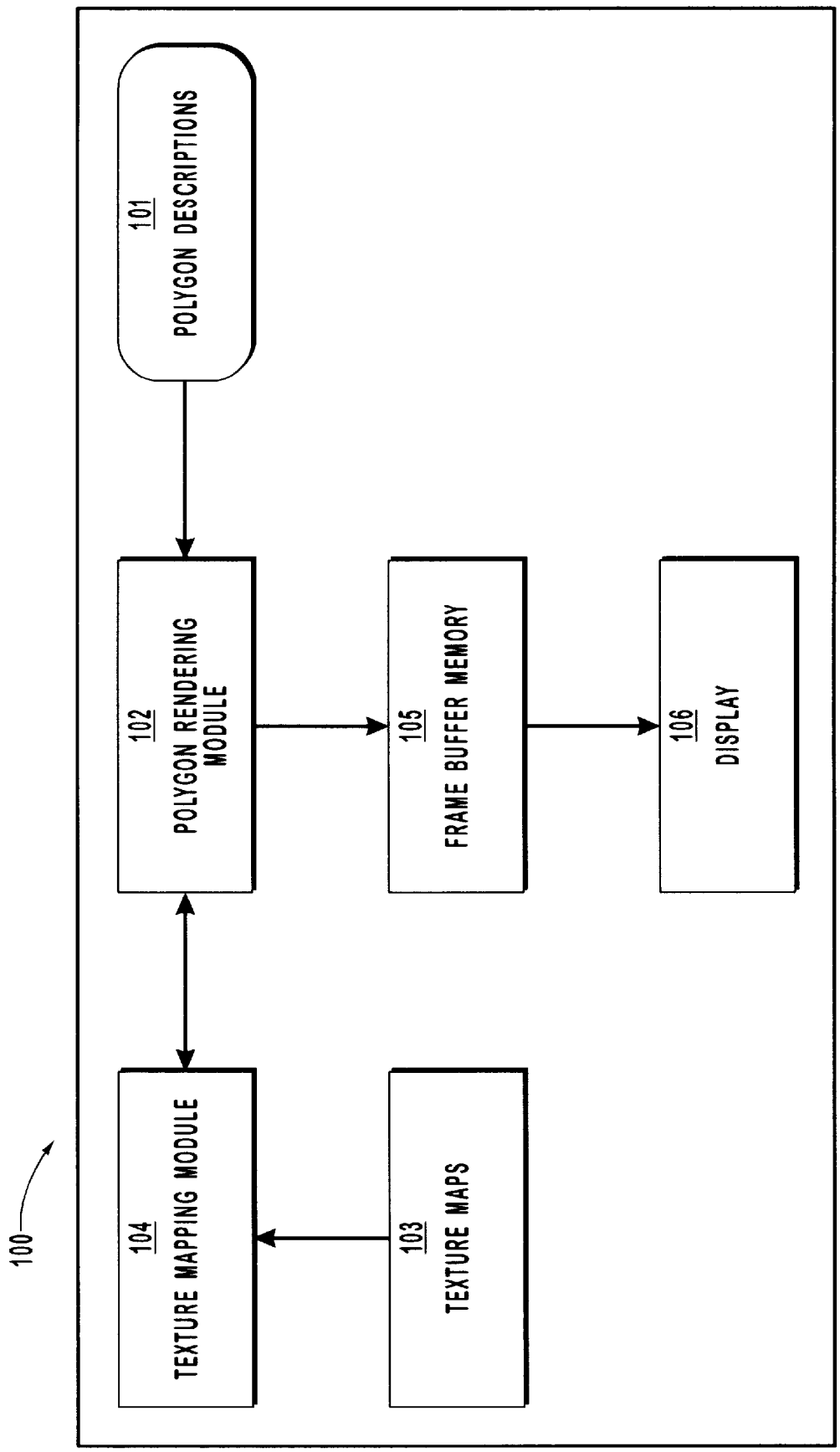
FIG. 1 is a block diagram of a system for practicing the present invention.

Referring now to FIG. 1, there is shown a block diagram of a system 100 for practicing the present invention. System 100 is typically implemented on a graphics device such as a Silicon Graphics Workstation, or on a graphics card included in a computer system such as a personal computer having an Intel Pentium™ processor and running the Windows™ 95 operating system from Microsoft Corporation. Polygon rendering module 102 generates pixel values using stored polygon descriptions 101 containing material values at polygon vertices. Module 102 may also implement projection algorithms that are known in the art in order to convert three-dimensional representations into two-dimensional projections for representation in frame buffer memory 105.

Texture mapping module 104 is provided to improve the appearance of projected polygons by applying surface features. Module 104 reads texture maps 103 containing texture images and provides projections according to known texture mapping techniques. Module 102 provides module 104 with texture coordinates associated with each pixel to be drawn on the screen. Module 102 also uses output of module 104 in rendering polygons. In one embodiment, the techniques of the present invention are implemented within texture mapping module 104.

Frame buffer memory 105 is conventional memory that may be optimized for storage of image data. Memory 105 typically contains a plurality of memory locations, each representing a pixel in the image to be displayed. Each location of memory 105 contains relevant information describing the appearance of the corresponding pixel, such as a color value. Display 106, which may be a conventional cathode-ray tube or other type of output device, presents the contents of some portion of memory 105 to the user.

The block diagram of FIG. 1 illustrates merely one possible structural scheme for implementing the present invention. Those skilled in the art will recognize that other architectures may be used without departing from the spirit or essential characteristics of the invention.

Figure 2:
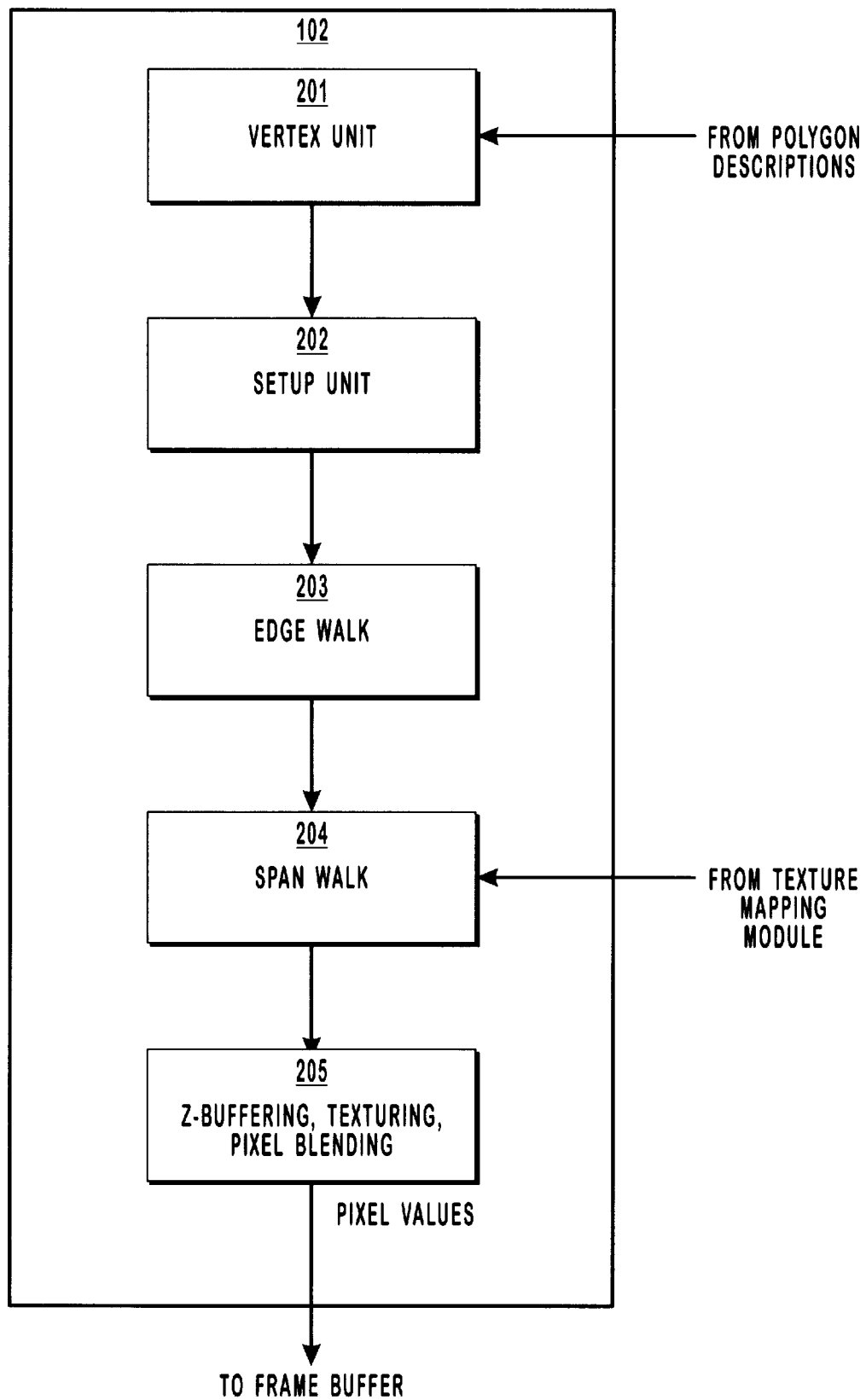
FIG. 2 is a diagram of an overall pipeline of a polygon rendering module.

Referring now to FIG. 2, there is shown a diagram of the overall pipeline of a polygon rendering module 102 according to one embodiment of the present invention. The components shown in FIG. 2 are conceptual functional units, which may be implemented as discrete physical components, or as part of a single overall hardware or software element. For illustrative purposes, the pipeline operation of module 102 is described in terms of operation on a single triangular primitive. However, the present invention is able to operate on any number of primitives simultaneously, and other primitive shapes may be employed. Detailed operation of the pipeline of FIG. 2 may be implemented, for example, as disclosed in related U.S. application Ser. No. 09/057393, Malamy et al., "Polygon Rendering Method And System With Dedicated Setup Engine", filed Apr. 8, 1998.

Vertex unit 201 autonomously reads data describing material values at each vertex of a polygon. Material values may include, for example, x and y coordinates, color values, texture, luminance, and the like. These values are read from memory in a conventional manner. In one embodiment, vertex unit 201 obtains these values from stored polygon descriptions 101, though some of the values may be derived or calculated by known projection, interpolation, or other methods. Vertex unit 201 then provides coordinate values and other material values for each of the vertices of the triangle being rendered.

The output of vertex unit 201, including for example x and y coordinates, color, texture, and the like, are passed to setup unit 202. Setup unit 202 operates as described in the related U.S. patent application, and generates values that may be of use in subsequent processing. Edge walk module 203 accepts the output of setup unit 202 and determines a starting pixel for each span of the triangle, where a span is a horizontal row of pixels lying within the bounds of the triangle. Module 203 also determines material values for the starting pixel.

Values determined by edge walk module 203 are passed to span walk module 204. Span walk module 204 also accepts the gradients determined by setup unit 202. Module 204 then walks horizontally along the span, determining values for all pixels in the span. As span walk module 204 passes along each pixel, it determines material values for the pixel and passes such values down the pipeline to other components 205. Other components 205 are conventional graphics processing components, such as modules for z-buffering, texturing, blending, and the like, as are known in the art.

Texture mapping module 104 performs operations associated with applying a stored texture map 103 to a polygon. Such texture mapping operations are employed in order to lend greater realism to a three-dimensional scene being rendered by applying a two-dimensional image to one or more of the surfaces of the scene. Texture mapping is well-known in the art, and is often used as an expedient alternative to separate rendering and modeling of each component of the scene on an individual basis.

Figure 3B:
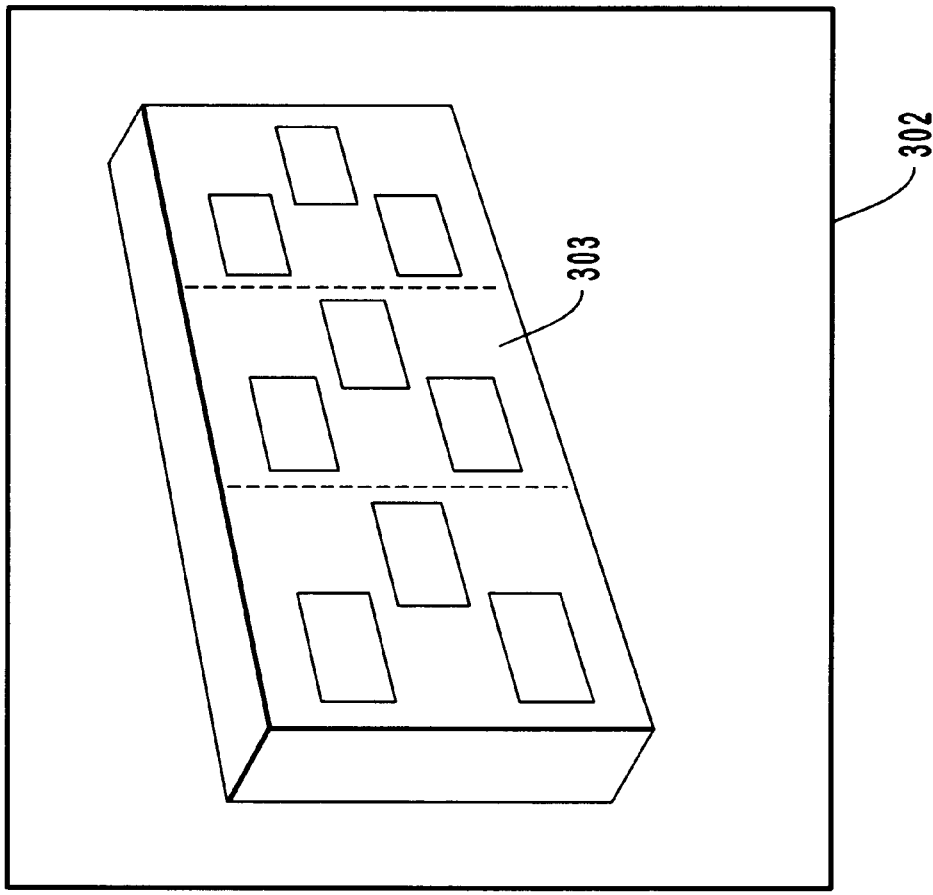
FIGS. 3A and 3B show an example of texture mapping.
Figure 3A:
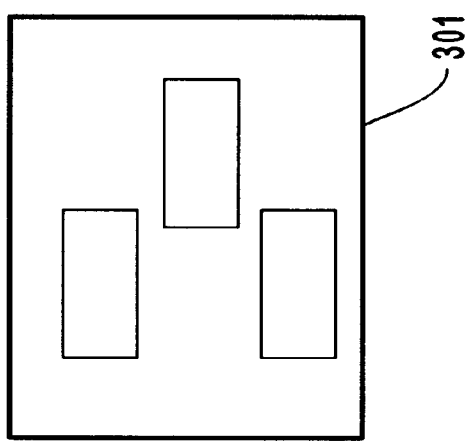

For example, as shown in FIGS. 3A and 3B, mapping texture 301 onto surface 303 provides an alternative to separate modeling and rendering of each individual brick as a three-dimensional object. A stored texture 301 containing a two-dimensional representation of bricks is mapped onto a rectangular surface 303 in a three-dimensional scene 302 in order to give the impression that surface 303 is made of bricks. Surface 303 may contain several copies of texture 301, as is shown in the example, in order to provide coverage for the entire surface.

Figure 6:
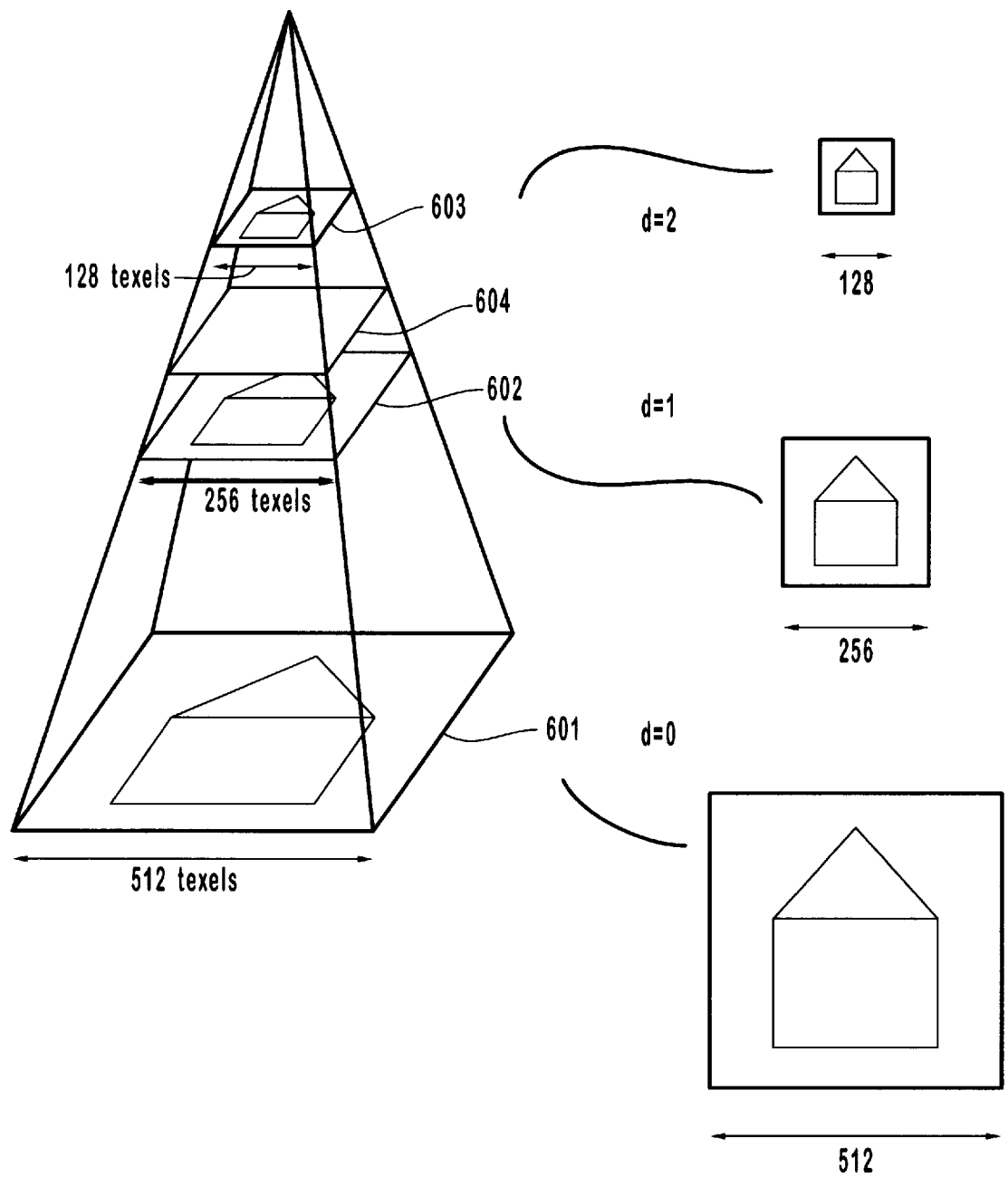
FIG. 6 shows a texture stored at three levels of detail.

As described above, each pixel in the surface to be rendered is mapped to a particular texel or to a filtered group of texels, and the material values associated with that texel or filtered group are applied to the pixel. In order to facilitate mappings onto a wide range of surfaces sizes, texture map 301 may be stored at several levels of detail (LODs). Referring now to FIG. 6, there is shown a conceptual diagram of a texture stored at three LODs 601, 602, and 603. Each LOD is associated with a value, designated d, representing the perceived distance associated with that particular LOD. The d value, which is proportional to the base-two logarithm of a corresponding LOD's dimension, may be used to identify a particular LOD. Other dimensions and bases may also be used.

In addition, there is shown an interpolated LOD 604 that may be developed and used when the surface to which the texture is being mapped dictates that an intermediate size is needed. In developing an interpolated LOD, texture mapping module 104 selects the closest stored LOD to the desired LOD and applies a filtering method to derive the interpolated LOD. As described above, such filtering method may include any of several known techniques, including for example point-sampling, linear, bilinear, or trilinear methods.

Figure 4B:
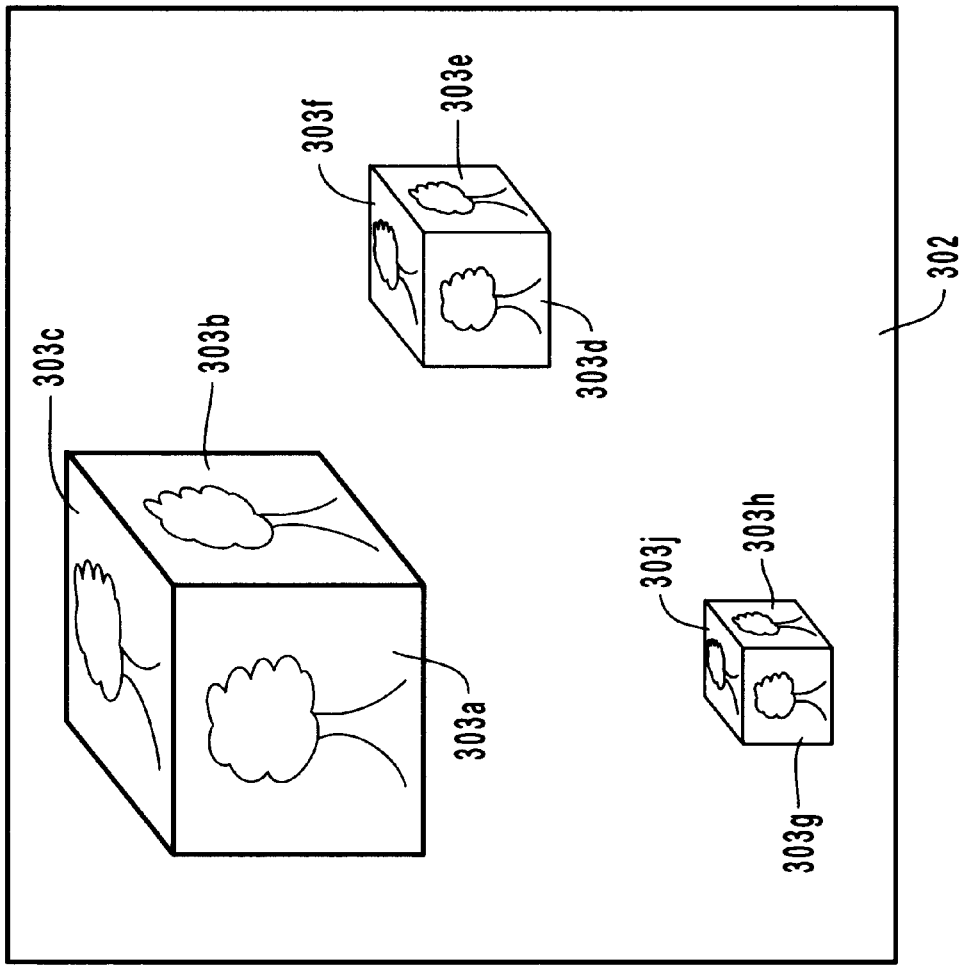
FIGS. 4A and 4B show an example of a texture being applied at differing sizes.
Figure 4A:
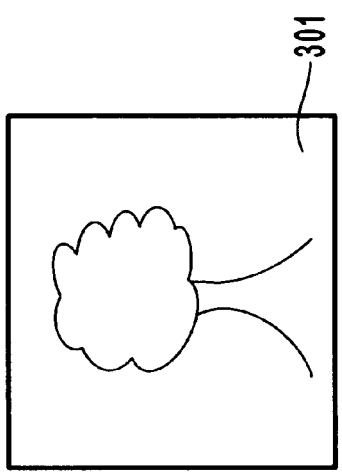

Referring now to FIGS. 4A and 4B, there is shown an example of texture 301 being applied to scene 302 having a number of surfaces 303A–J with varying sizes. For small surfaces, such as 303G, a smaller LOD would be more appropriate. Although a larger LOD could be used for all the surfaces shown in scene 302, significant computational savings can be accomplished by using several LODs for various portions of the image, in order to limit the amount of filtering required.

Selection of an appropriate LOD from which to begin filtering typically depends upon the overall size of the surface being rendered. Where the shape of the surface indicates that distortion of the texture is warranted, different LODs may be employed for different portions of the texture. For example, referring again to FIG. 3B, the far right section of surface 303 gives the impression of receding into the distance in the three-dimensional scene 302; therefore that section of surface 303 may employ a smaller LOD than would the leftmost section.

LOD selection operates as follows. During rendering, edge walk module 203 and span walk module 204 iterate down edges and along spans of primitives such as triangles, determining material values for each pixel in turn. As described in the related application, values to be determined for each succeeding pixel may include, for example, color and z-coordinate data (for z-buffering). When texture mapping is being performed, a texture coordinate value is also associated with each pixel location in the primitive. The texture coordinates associated with a particular pixel (x,y) are designated as (u,v). Thus, in order to determine a particular texel to be mapped to pixel (x,y), texture mapping module 104 performs an indexed read operation into the appropriate LOD of texture map 301, using derived values for (u,v), in order to retrieve the appropriate texel value for application (with associated filtering, if needed) to pixel (x,y).

Figure 5:
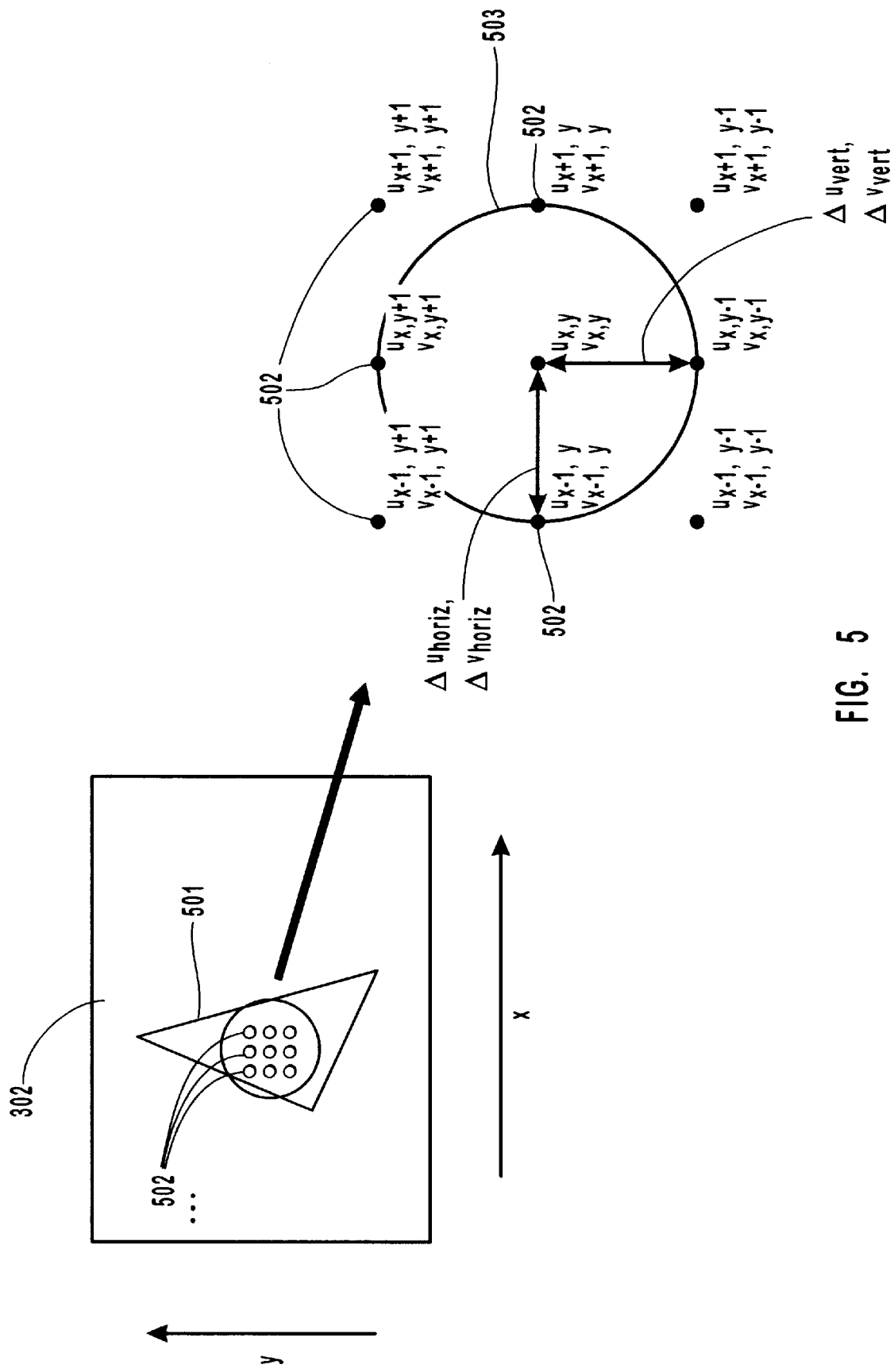
FIG. 5 shows an example of a primitive having pixels with associated (u,v) values.

Selection of an appropriate LOD may therefore be accomplished by determining the distance traversed in texture space associated with a one-pixel traversal in screen space. Referring now to FIG. 5, there is shown a scene 302 containing a primitive 501. Primitive 501 contains a number of pixels 501, each of which may be identified by position with respect to the x- and y-axes. For each pixel (x,y), a corresponding position (u,v) in texture space may be identified using known mapping techniques.

Thus, in the enlarged detail of FIG. 5, the center pixel 502, having screen coordinates of (x,y), is associated with texture coordinates designated ($u_{x,y}$, $v_{x,y}$). The pixel 502 immediately to the right of the center pixel 502 has screen coordinates (x+1,y) and is therefore associated with texture coordinates designated ($u_{x+1,y}$, $v_{x+1,y}$). Other pixels 502 are labeled accordingly.

To determine which LOD is appropriate for texture mapping a particular pixel, the (u,v) values associated with the pixel are compared with the (u,v) values associated with points located a unit distance away from the pixel, such as those located on unit circle 503 surrounding the pixel. The change in (u,v) values corresponding to such a one-pixel shift is designated as ($\Delta u,\Delta v$). Where the values of $\Delta u$ and $\Delta v$ are large, a smaller LOD is used. Conversely, where the values of $\Delta u$ and $\Delta v$ are small, a larger LOD is used.

Typically, the values of $\Delta u$ and $\Delta v$ are not constant for every point around the unit circle, particularly where the texture is being distorted in order to fit a surface having irregular shape, or in order to provide perspective correction. In many situations, the value of $\Delta u$ and $\Delta v$ corresponding to a horizontal movement ($\Delta u_{horiz}$, $\Delta v_{horiz}$) is not equal to the value of $\Delta u$ and $\Delta v$ corresponding to a vertical movement ($\Delta u_{vert}$, $\Delta v_{vert}$).

In one embodiment, the present invention employs a technique wherein the largest value of the set $\{\Delta u_{horiz}, \Delta v_{horiz}, \Delta u_{vert}, \Delta v_{vert}\}$ is used to determine LOD. Values for $\Delta u$ and $\Delta v$ for other points around the unit circle may also be determined, though each additional such calculation generally introduces additional computational overhead and results in poorer performance.

Figure 7:
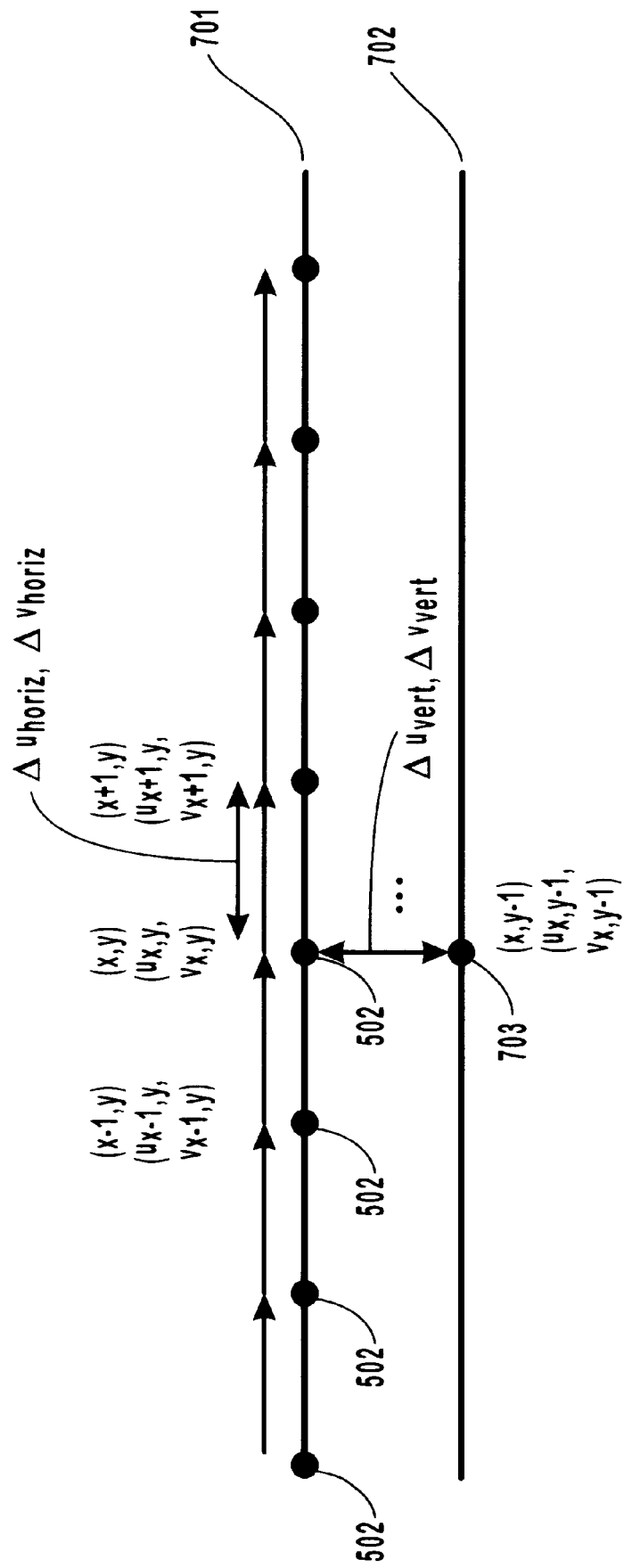
FIG. 7 shows a straight-line traversal path along a span.

Referring now to FIG. 7, there is shown an example of ($\Delta u$, $\Delta v$) determination along a span of a primitive. As described above, span walk module 204 processes each pixel 502 of span 701 in turn, determining material values and texture coordinates (u,v). For example, when span walk module 204 is processing pixel (x,y), it determines texture coordinates ($u_{x,y}$, $v_{x,y}$). In order to determine values for $\Delta u_{horiz}$ and $\Delta v_{horiz}$, texture map module 104 compares ($u_{x,y}$, $v_{x,y}$) with ($u_{x+1,y}$, $v_{x+1,y}$). Since these values are conveniently associated with the next pixel to be processed by module 204, module 104 can obtain access to these values by waiting one cycle in the rendering process.

By employing pipelining operations as described above and as known in the art, LOD selection may be deferred until values for ($u_{x+1,y}$, $v_{x+1,y}$) have been determined for the next pixel in span 701. Since these values need to be determined anyway for conventional span walking and texture mapping, no additional computational overhead is needed (other than the simple subtraction required to determine $\Delta u_{horiz} = u_{x+1,y} - u_{x,y}$ and $\Delta v_{horiz} = v_{x+1,y} - v_{x,y}$).

As can be seen from FIG. 7 values for $\Delta u_{vert}$ and $\Delta v_{vert}$ depend upon values associated with a pixel 703 in the next span 702. If pixels are traversed along one span before proceeding to the next span, as is conventional in the art, the values needed to determine $\Delta u_{vert}$ and $\Delta v_{vert}$ may not be made available by simple deferral until the next pixel in a span has been processed. In fact, the values for the next span 702 will not be available until edge walk module 203 has proceeded to that span. Typically, this entails significant delay, making it impractical to defer LOD selection until the appropriate pixel has been processed.

Figure 8:
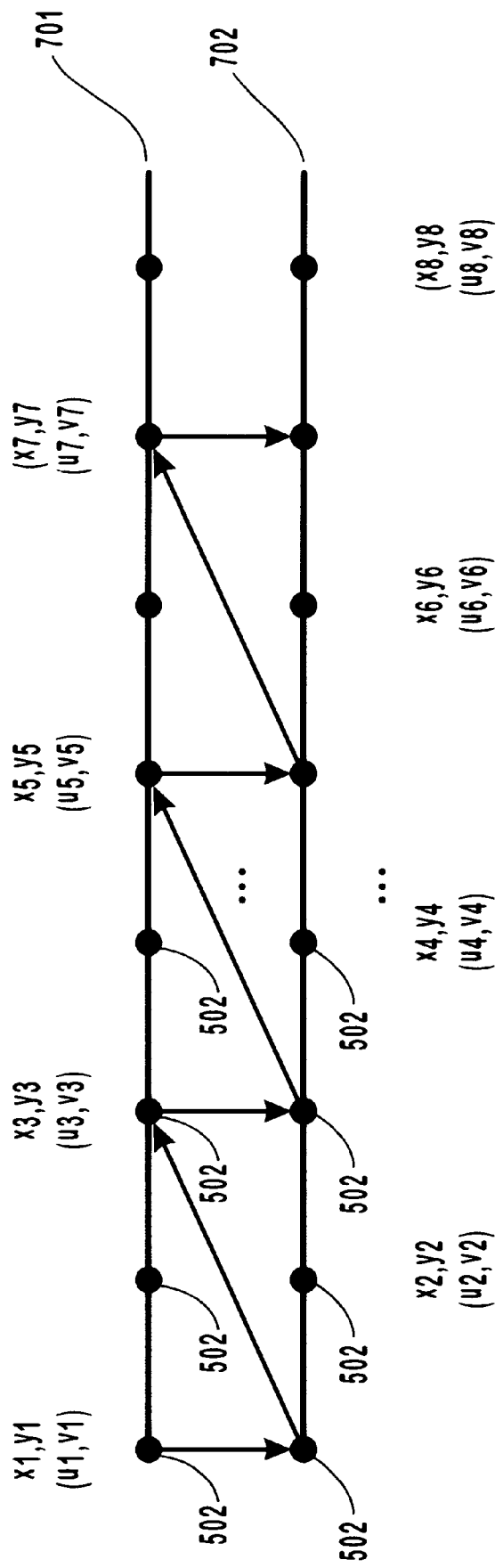
FIG. 8 shows a zig-zag traversal path along two spans.

Referring now to FIG. 8, there is shown a zig-zag traversal path across two spans 701, 702. By using this traversal path, the present invention implements LOD selection employing both vertical and horizontal $\Delta u$ and $\Delta v$ values without introducing significant additional computational complexity or delay.

In one embodiment, the invention operates as follows. In order to perform LOD selection for the pixel designated ($x_1$, $y_1$), the invention uses three sets of (u,v) values:

($u_1$, $v_1$), corresponding to the pixel ($x_1$, $y_1$);

($u_2$, $v_2$), corresponding to the pixel ($x_2$, $y_2$)=($x_1$, $y_{1+1}$) (the pixel immediately below ($x_1$, $y_1$));

($u_3$, $v_3$), corresponding to the pixel ($x_3$, $y_3$)=($x_1$+2, $y_1$) (the pixel two units to the right of ($x_1$, $y_1$));

By employing the traversal path shown, these three sets of (u,v) values are made available by delaying LOD selection for two cycles. For any point in span 701, the values for (u,v) needed to determine $\Delta u$ and $\Delta v$ in the vertical and horizontal directions are available within two cycles. Conventional pipelining techniques may be employed to implement such a delay.

Once the three sets of (u,v) values are known, the $\Delta u$ and $\Delta v$ values are determined by:

$\Delta u_{vert} = u_2 - u_1$ $\Delta v_{vert} = v_2 - v_1$ $\Delta u_{horiz} = (u_3 - u_1)/2$ $\Delta v_{horiz} = (v_3 - v_1)/2$ In one embodiment, values for $\Delta u_{horiz}$ and $\Delta v_{horiz}$ are determined based on a pixel two units to the right of the current pixel. This is an approximation which has been found to have little detrimental effect upon the quality of the image. The (u,v) values for skipped pixels are estimated by averaging the values for the two pixels on either side. For these skipped pixels, the same LOD is selected as was used for the immediately preceding pixel. For the last pixel in a span, the previously obtained LOD selection is re-used.

Material value determination for color, z-value, and the like, is performed by conventional means along a single span without skipping pixels. This may take place in parallel with the zig-zag traversal being performed for LOD determination.

Figure 11:
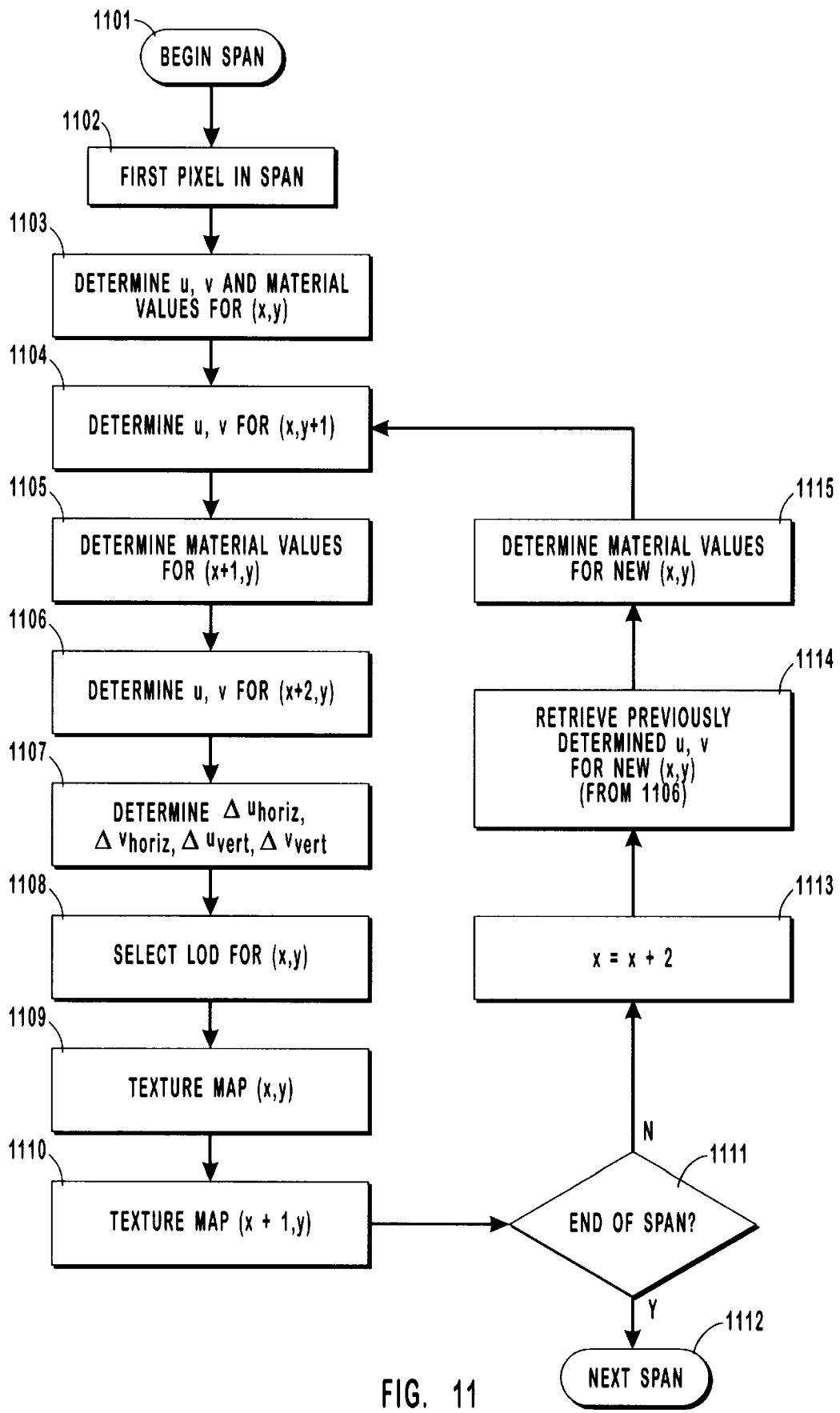
FIG. 11 is a flowchart showing a method of practicing the present invention.

Referring now to FIG. 11, there is shown a flowchart of a method of operation according to one embodiment of the invention. For ease of illustration, the flowchart of FIG. 11 displays steps in a linear fashion, without showing the parallelism inherent in the pipelined architecture described above. However, one skilled in the art will recognize that the steps of FIG. 11 can be implemented in parallel form so as to improve performance by determining LOD for one pixel while another pixel is being rendered. In addition, the order in which the steps are performed can be altered without departing from the spirit or essential characteristics of the present invention.

Span walk module 204 begins 1101 processing a span. The first pixel is selected 1102 and its coordinates are designated (x,y). Module 204 then determines 1103 (u,v) coordinates in texture space, as well as material values, for pixel (x,y). Module 204 then determines 1104 (u,v) coordinates for pixel (x,y+1) located immediately below the pixel being processed. Rendering operations based on material values determined in step 1103 may be performed in parallel with this step. Module 204 then determines 1105 material values for pixel (x+1,y) and performs rendering operations based on these material values. This is part of the conventional straight-line processing of material values that occurs in parallel with the zig-zag traversal being used for LOD determination.

Module 204 then determines 1106 (u,v) coordinates for pixel (x+2,y). Using the (u,v) values determined in steps 1103, 1104, and 1106, module 204 then determines 1107 $\Delta u$ and $\Delta v$ values in the horizontal and vertical direction, using the equations described previously in connection with FIG. 8. Module 204 then uses the maximum $\Delta$ value to select 1108 an LOD for pixel (x,y). This may be done by taking the base-two logarithm of the maximum $\Delta$ value. Using the selected LOD, texture map module 104 retrieves 1109 the relevant portion of the appropriate version of the texture map, and performs filtering if necessary to determine values to be applied at pixel (x,y). Module 104 then performs 1110 the same operation on pixel (x+1,y), using the same LOD that was selected for pixel (x,y).

If in 1111 the end of the span has been reached, span walk module 204 proceeds 1112 to the next span.

If in 1111 the end of the span has not been reached, module 204 increments 1113 x by 2 to continue the zig-zag traversal path. Values for (u,v) applicable to the new (x,y) pixel need not be recalculated; since they were previously determined in 1106, they are retrieved 1114 for re-use. Module 204 then determines 1115 material values for pixel (x,y), and performs associated rendering operations, a step that may take place in parallel with LOD determination. Module 204 then returns to 1104 and performs steps 1104 though 1110 to continue LOD determination and mapping for the new pixel.

In certain special cases, deviations from the above-described zig-zag traversal path are employed. Referring now to FIG. 9A, there is shown an example of a primitive 901 having a span 902 containing a single pixel 904. In such a case, span 902 does not contain any other pixels available to develop Δu and Δv for the horizontal direction. In one embodiment, texture mapping module 104 uses a pixel 906 located outside the bounds of primitive 901 in order to determine Δu and Δv. Although pixel 906 is not normally rendered, since it lies outside the bounds of primitive 901 and is not part of span 902, the (u,v) values for pixel 906 are useful in performing LOD selection for pixel 904. As long as accessing pixel 906 does not generate an overflow condition, its (u,v) values are therefore usable for Δu and Δv determination in the horizontal direction. This determination also avoids the division by two described above in connection with FIG. 8. Pixel 905 is also used, in the manner as described previously, for determination of Δu and Δv in the vertical direction.

Referring now to FIG. 9B, there is shown a special case wherein the span 909 being processed contains an even number of pixels. In one embodiment, the final pixel 911 in span 909 is reached by moving to the right one pixel instead of two. Thus, the determination of Δu and Δv in the horizontal direction for pixel 911 is performed without the division by two shown above.

Figure 10A:
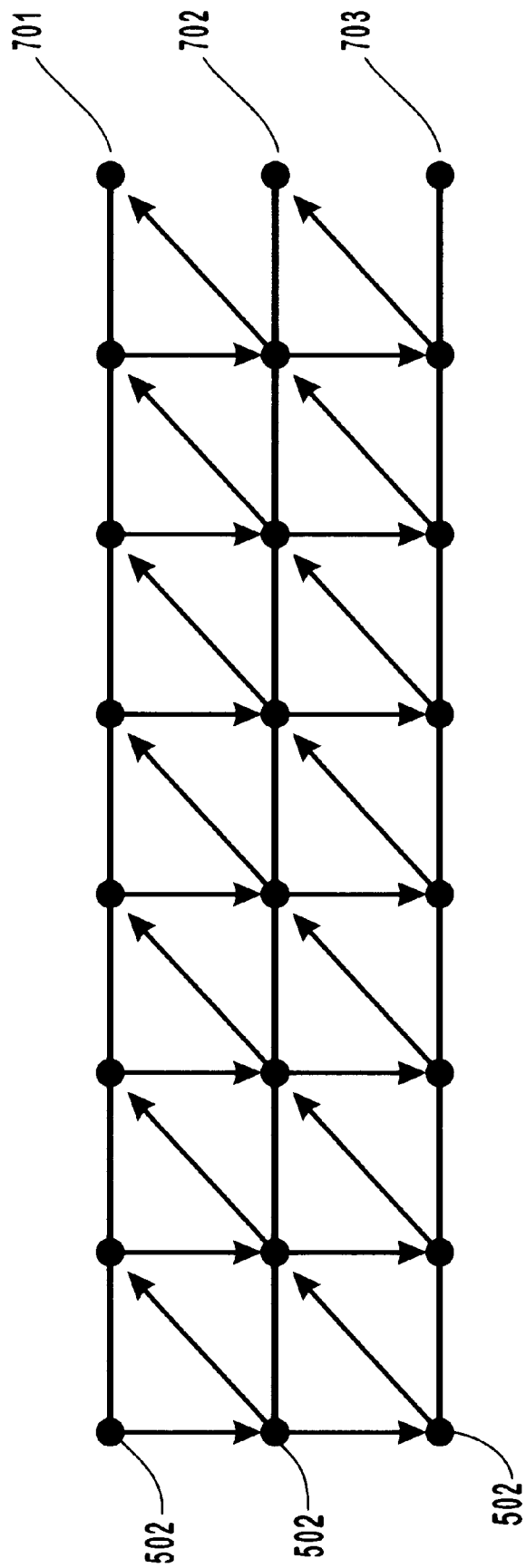
FIG. 10A shows an alternate zig-zag traversal path.

In an alternative embodiment, a zig-zag traversal path is employed that does not skip pixels in the horizontal direction. Referring now to FIG. 10A, there is shown an example of such a traversal path as applied to spans 701 and 702 in turn. Once span walk module 204 completes the traversal of span 701, it proceeds to the next span 702. During the traversal of each span, pixels from the next span are referenced in order to determine $\Delta u_{vert}$ and $\Delta v_{vert}$ in similar manner to that described above for FIG. 8. Thus, during rendering of span 701, pixels from span 702 are examined for LOD selection; similarly, during rendering of span 702, pixels from span 703 are examined. The traversal path shown in FIG. 10A avoids the approximation described above in connection with FIG. 8, by providing, for each pixel, the (u,v) values for the pixels immediately to the right and below the pixel. However, the path of FIG. 10A may entail additional computational overhead when compared with the path of FIG. 8, since twice as many (u,v) values are determined per span.

Figure 10B:
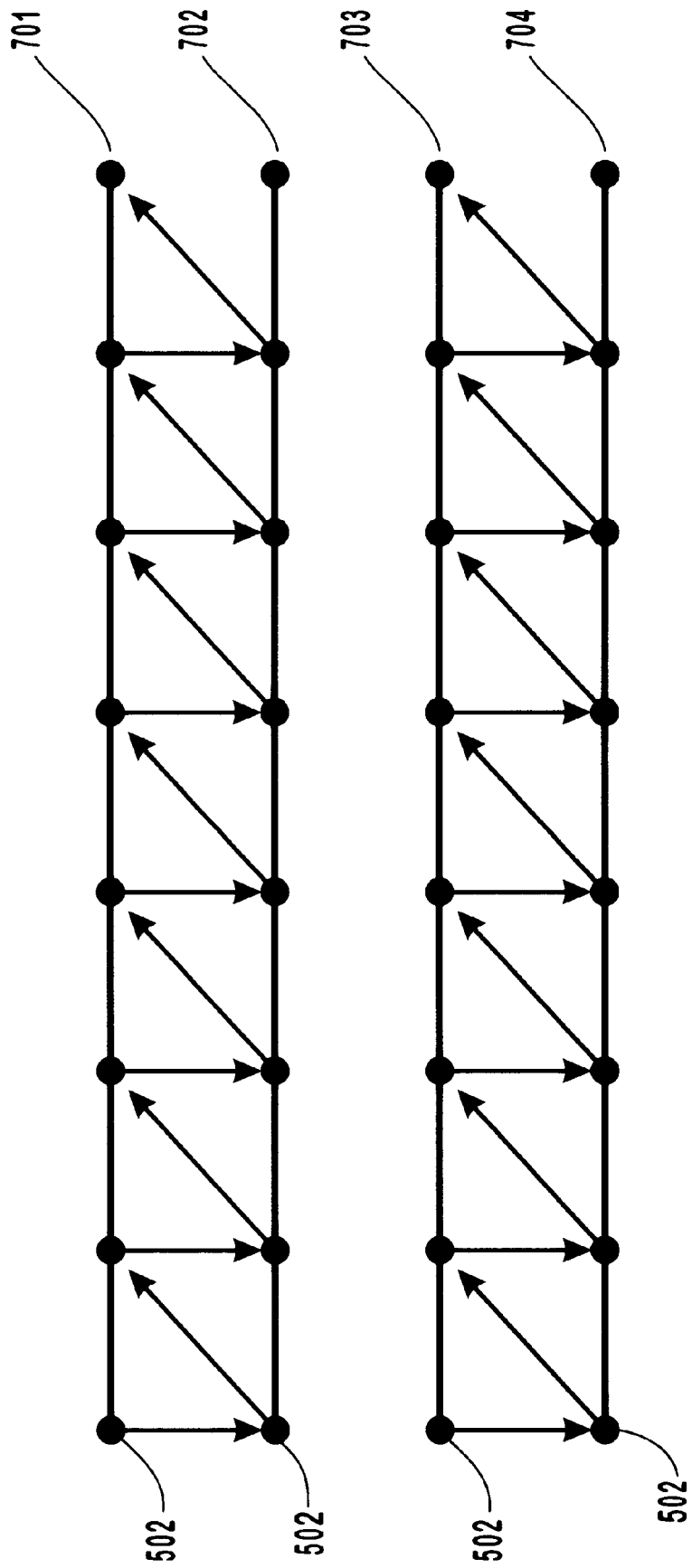
FIG. 10B shows a second alternate zig-zag traversal path.

Referring now to FIG. 10B, there is shown another alternative zig-zag traversal path. In this embodiment, a pair of spans is rendered during one pass, so that repetitive determination of (u,v) values is avoided. Thus, span walk module 204 performs material value determination and rendering for spans 701 and 702 in one pass, using the zig-zag traversal path shown. Thus, (u,v) values for each pixel for LOD selection are available using the pipelining techniques above. Unlike the traversal path of FIG. 10A, once a pixel is processed as part of a zig-zag path, it need not be processed a second time for the succeeding span. Thus, the method of FIG. 10B avoids the approximation described in connection with FIG. 8, and also avoids the additional computational overhead that may be required for the traversal path of FIG. 10A.

From the above description, it will be apparent that the invention disclosed herein provides a novel and advantageous system and method of selecting a level of detail in a texture mapping operation without introducing undue computational burden. The foregoing discussion discloses and describes merely exemplary methods and embodiments of the present invention. As will be understood by those familiar with the art, the invention may be embodied in other specific forms without departing from the spirit or essential characteristics thereof. For example, other architectures and traversal paths may be used. Accordingly, the disclosure of the present invention and example figures are intended to be illustrative, but not limiting, of the scope of the invention, which is set forth in the following claims.

What is claimed is:

1. In a texture-mapping system, a method of selecting a level of detail of a texture map for rendering a primitive, the primitive having at least one span, each span having at least one pixel, comprising:

(a) selecting a first pixel in a span of the primitive;

(b) determining texture map coordinates corresponding to the first pixel;

(c) determining horizontal and vertical change values for texture map coordinates corresponding to the first pixel;

(d) responsive to the horizontal and vertical change values, selecting a level of detail for the first pixel;

(e) texture-mapping the first pixel according to the selected level of detail; and (f) repeating (a) through (e) for a second pixel in the span, wherein the repetition of (b) comprises retrieving previously determined texture map coordinates.

2. The method of claim 1, wherein (c) comprises:

(c.1) determining second texture map coordinates corresponding to a second pixel in the primitive;

(c.2) determining third texture map coordinates corresponding to a third pixel in the primitive;

(c.3) determining a vertical change value from the difference between the first and second texture map coordinates; and (c.4) determining a horizontal change value from the difference between the first and third texture map coordinates.

3. The method of claim 2, wherein the second pixel in the primitive is located in a span adjacent to the span of the first pixel, and the third pixel in the primitive is located in the span of the first pixel.

4. The method of claim 3, wherein the second pixel in the primitive is vertically adjacent to the first pixel, and the third pixel in the primitive is located two pixels away from the first pixel in the span of the first pixel.

5. The method of claim 3, wherein the second pixel in the primitive is vertically adjacent to the first pixel, and the third pixel in the primitive is horizontally adjacent to the first pixel.

6. The method of claim 2, wherein the third pixel in the primitive corresponds to the second pixel in the span.

7. The method of claim 1, wherein (d) comprises:

(d.1) determining a maximum value from the horizontal and vertical change values;

(d.2) determining a logarithm of the maximum value; and (d.3) selecting a level of detail responsive to the value of the logarithm.

8. The method of claim 1, wherein step (e) is performed simultaneously with step (f) using pipelining.

9. The method of claim 1, further comprising determining at least one material value for the first pixel and rendering the first pixel using the at least one determined material value.

10. The method of claim 9, further comprising:

(h.1) determining at least one material value for each of the selected and second pixels;

and wherein (i) comprises texture mapping and rendering the selected and second pixels using the retrieved portions of the texture map and the determined material values.

11. In a texture-mapping system, a method of selecting a level of detail of a texture map for rendering a primitive, the primitive having at least one span, each span having at least one pixel, comprising:

(a) selecting a pixel in a span of the primitive;

(b) determining texture map coordinates corresponding to the selected pixel;

(c) determining texture map coordinates corresponding to a second pixel located vertically adjacent to the selected pixel;

(d) determining texture map coordinates corresponding to a fourth pixel located two pixels away from the selected pixel in a horizontal direction;

(e) determining, from the results of (b) and (c), a vertical change value;

(f) determining, from the results of (b) and (d), a horizontal change value;

(g) responsive to the results of (e) and (f), selecting a level of detail;

(h) retrieving first and second selected portions of a texture map corresponding to the selected level of detail and to the texture map coordinates corresponding to the selected pixel and to a third pixel horizontally adjacent to the selected pixel;

(i) texture mapping the selected and third pixels using the retrieved portions of the texture map;

(j) designating the fourth pixel as the selected pixel;

(k) retrieving previously determined texture map coordinates corresponding to the selected pixel; and (l) repeating (c) through (i) for the selected pixel.

12. The method of claim 11, further comprising:

(b.1) determining at least one material value corresponding to the selected pixel; and (c.1) determining at least one material value corresponding to the third pixel;

and wherein (i) comprises texture mapping and rendering the selected and third pixels using the retrieved portions of the texture map and the determined material values.

13. In a texture-mapping system, a method of selecting a level of detail of a texture map for rendering a primitive, the primitive having at least one span, each span having at least one pixel, comprising:

(a) selecting a pixel in a span of the primitive;

(b) determining texture map coordinates corresponding to the selected pixel;

(c) determining texture map coordinates corresponding to a second pixel located vertically adjacent to the selected pixel;

(d) determining texture map coordinates corresponding to a third pixel located horizontally adjacent to the selected pixel;

(e) determining, from the results of (b) and (c), a vertical change value;

(f) determining, from the results of (b) and (d), a horizontal change value;

(g) responsive to the results of (e) and (f), selecting a level of detail;

(h) retrieving first and second selected portions of a texture map corresponding to the selected level of detail and to the texture map coordinates corresponding to the selected and second pixels;

(i) texture mapping the selected and second pixels using the retrieved portions of the texture map;

(j) designating the third pixel as the selected pixel;

(k) retrieving previously determined texture map coordinates corresponding to the selected pixel; and (l) repeating (c) through (i) for the selected pixel.

14. A computer-implemented system for selecting a level of detail of a texture map for rendering a primitive, the primitive having at least one span, each span having at least one pixel, comprising:

a span walk module for selecting a first pixel in a span of the primitive, determining texture map coordinates corresponding to the first pixel, and determining horizontal and vertical change values for texture map coordinates corresponding to the first pixel;

a level of detail selector, coupled to the span walk module, for, responsive to the horizontal and vertical change values, selecting a level of detail for the first pixel; and a texture mapping module, coupled to the level of detail selector, for texture-mapping the first pixel according to the selected level of detail;

wherein:

the span walk module selects a second pixel in the span, retrieves previously determine texture map coordinates corresponding to the second pixel, and determines horizontal and vertical change values for texture map coordinates corresponding to the first pixel;

and wherein the level of detail selector selects a level of detail for the second pixel;

and wherein the texture mapping module texture-maps the second pixel.

15. The computer-implemented system of claim 14, wherein the level of detail selector comprises:

a texture map coordinate determination module for determining second texture map coordinates corresponding to a second pixel in the primitive, and for determining third texture map coordinates corresponding to a third pixel in the primitive; and a vertical change value determination module coupled to the texture map coordinate determination module, for determining a vertical change value from the difference between the first and second texture map coordinates, and for determining a horizontal change value from the difference between the first and third texture map coordinates.

16. The computer-implemented system of claim 14, further comprising:

a material value determination module, coupled to the span walk module, for determining at least one material value for the first pixel; and a renderer, coupled to the material value determination module, for rendering the first pixel using the at least one determined material value.

* * * * *

UNITED STATES PATENT AND TRADEMARK OFFICE
CERTIFICATE OF CORRECTION

PATENT NO. : 6,100,898
DATED : August 8, 2000
INVENTOR(S) : Adam Malamy; Nicholas R. Baker; Adrian Sfarti; Victor Tirva It is certified that error appears in the above-identified patent and that said Letters Patent is hereby corrected as shown below:

Column 5,
Line 41, after "of" change "surfaces" to -- surface --

Signed and Sealed this

Thirtieth Day of October, 2001

Attest:

*Nicholas P. Godici*

NICHOLAS P. GODICI
*Attesting Officer*    *Acting Director of the United States Patent and Trademark Office*